(12) United States Patent
Arnesson et al.

(10) Patent No.: US 11,167,538 B2
(45) Date of Patent: Nov. 9, 2021

(54) CORRUGATED BOARD AND CONTAINER

(71) Applicant: SCA Forest Products AB, Sundsvall (SE)

(72) Inventors: Petter Arnesson, Matfors (SE); Rickard Boman, Matfors (SE); Rickard Hägglund, Kvissleby (SE); Magnus Viström, Sundsvall (SE)

(73) Assignee: SCA FOREST PRODUCST AB, Sundsvall (SE)

( * ) Notice: Subject to any disclaimer, the term of this patent is extended or adjusted under 35 U.S.C. 154(b) by 0 days.

(21) Appl. No.: 16/767,172

(22) PCT Filed: Nov. 28, 2017

(86) PCT No.: PCT/EP2017/080656
§ 371 (c)(1),
(2) Date: May 27, 2020

(87) PCT Pub. No.: WO2019/105525
PCT Pub. Date: Jun. 6, 2019

(65) Prior Publication Data
US 2020/0384722 A1    Dec. 10, 2020

(51) Int. Cl.
*B32B 29/00* (2006.01)
*B32B 1/02* (2006.01)
(Continued)

(52) U.S. Cl.
CPC .............. *B32B 29/005* (2013.01); *B32B 1/02* (2013.01); *B32B 3/28* (2013.01); *B32B 27/10* (2013.01); *B32B 29/08* (2013.01); *B65D 65/403* (2013.01); *B32B 2250/05* (2013.01); *B32B 2255/12* (2013.01); *B32B 2307/3065* (2013.01); *B32B 2307/546* (2013.01); *B32B 2307/714* (2013.01); *B32B 2307/7242* (2013.01);
(Continued)

(58) Field of Classification Search
CPC .......... B32B 1/02; B32B 3/28; B32B 29/005; B32B 29/08; B32B 2250/05; B32B 2255/12; B32B 2307/3065; B32B 2307/546; B32B 2307/714; B32B 2307/7242; B32B 2307/7244; B32B 2307/7248; B32B 2307/7265; B32B 2419/00; B32B 2439/62; B32B 2479/00; B32B 2553/00
See application file for complete search history.

(56) References Cited

U.S. PATENT DOCUMENTS 4,286,006 A * 8/1981 Boelter .................... B32B 3/28
428/182
2011/0195231 A1  8/2011 Lai et al.

FOREIGN PATENT DOCUMENTS

| FR | 2 956 352 A1 | 8/2011 |
|---|---|---|
| WO | 2013/012362 A1 | 1/2013 |
| WO | 2013/141769 A1 | 9/2013 |

\* cited by examiner

*Primary Examiner* — Walter Aughenbaugh
(74) *Attorney, Agent, or Firm* — Faegre Drinker Biddle & Reath LLP

(57) ABSTRACT

A multilayer corrugated board which can be smoothly bent from a planar state to a curved state without failure even at small radii of curvature, as well as a container made from such board. The materials and mechanical properties of the layers of the board are selected such that each layer inward of the outermost layer in the bent state buckles simultaneously and reversibly between each flute of the adjacent innermost corrugated layer.

19 Claims, 12 Drawing Sheets

(51) Int. Cl.
*B32B 3/28* (2006.01)
*B32B 27/10* (2006.01)
*B32B 29/08* (2006.01)
*B65D 65/40* (2006.01)

(52) U.S. Cl.
CPC ................ *B32B 2307/7244* (2013.01); *B32B 2307/7248* (2013.01); *B32B 2307/7265* (2013.01); *B32B 2419/00* (2013.01); *B32B 2439/62* (2013.01); *B32B 2479/00* (2013.01); *B32B 2553/00* (2013.01)

CORRUGATED BOARD AND CONTAINER

CROSS-REFERENCE TO PRIOR APPLICATIONS

This application is a § 371 National Stage Application of PCT International Application No. PCT/EP2017/080656 filed Nov. 28, 2017, which is incorporated herein in the entirety.

FIELD

The present invention relates to a corrugated board material and a container formed from the same.

BACKGROUND

Corrugated board is a widely used fibre-based packaging material.

The material is typically manufactured in a corrugating machine, in which a sheet material such as paper, known as the fluting medium, with a typical grammage in the range of 80-200 g/m$^2$, is corrugated to a wave shaped pattern. A sheet of a further flat material, such as paper or liner board, with a typical grammage in the range of 90-500 g/m$^2$, is glued on top of the corrugated material. These two sheet materials form together a conventional single faced corrugated board.

Such a conventional single-faced corrugated board is a flexible material which has a very low bending stiffness in the manufacturing direction (across the direction of the corrugated flute pipes) and has higher bending stiffness across the manufacturing direction (along the direction of the corrugated flute pipes).

Such a conventional single-faced board can be used as shock absorbing material to protect products.

Such a conventional single faced board is easy to store in rolls but is difficult to convert into a finished packaging structure by, for example, die cutting and printing because of the high flexibility (low bending stiffness) in the machine direction.

If a second layer of sheet material, sometimes termed the double backer liner board, is glued onto the other side of the corrugated fluting medium to the side having the first layer of sheet material glued, the result is a conventional single wall corrugated board which has a rather high bending stiffness in all directions.

Such a conventional single wall corrugated board exists in many standard formats, in which the length and height of the sine shaped waves (corrugated flutes) are varied. Common standard flute profiles are N, E, B, C, K, A-flute and the like. Definitions of the standard flute profiles are given in for example, to Chapter 3, FIGS. 3.1, 3.2 and 3.3 of "Mechanics of paper products", edited by Niskanen K., pub. Walter de Gruyter GmbH 2012, ISBN: 9783110254617, the contents of which Figures are hereby incorporated by reference to the extent permitted by law.

Combinations of these flute profiles can be used to form multi-layered corrugated board, for example double- and triple-walled corrugated board, in which several wave-shaped fluting mediums (up to three is most common) and flat sheets are glued together, resulting in a multi-layered corrugated board. Configurations of such multi-layered boards are referred to by the sequence of flute profiles, for example, BE, BC, AAC and similar notation.

The conventional multi-layered corrugated board provides higher strength (ECT according to ISO 3037:2013), bending stiffness (according to ISO 5628:2012) and shock protection, as compared with conventional single-layered board.

Further, the conventional multi-layered corrugated board allows for a reduced incidence of the so-called washboarding effect, which is the appearance of stripes on one of the external flat layers as a result of marks from the flute tops underlying the liner. Use of a relatively smaller (sometimes termed "finer") flute profile, that is, a flute profile providing a larger number of flutes per unit length of fluting, underneath the outer liner can reduce the washboarding effect. Smaller flute profiles typically have lower strength and impact resistance, but this can be balanced by combining, in one multi-layered board, a corrugated layer having a smaller flute profile with a corrugated layer having a flute profile with higher and longer wavelength. Such an approach allows the required strength to be achieved.

Conventional single-, double- and triple-walled corrugated board are distributed as flat sheets and cannot be rolled into reels, since the material cannot easily adopt curved shapes. Typical radii of smooth bending for different flute profiles of conventional corrugated board are listed in Table 1. For the values in the Table 1, the measurements were performed using 4-point bending tests in the manufacturing direction (across the direction of the corrugated flute pipes) according to ISO 5628:2012.

TABLE 1

| F | BE | C | B | E | G |
|---|---|---|---|---|---|
| R (mm) | 1000-1200 | 1500-2000 | 1400-1800 | 280-350 | 110-140 |

(F = flute profile; R = minimum radius of smooth bending)

Obtaining smooth curvatures with small radii when bending conventional multi-layered corrugated board in the machine direction is typically not possible.

For example, FIG. 1 shows a construction of a conventional double-wall corrugated board 900.

In FIG. 1:
Lo is the first outer liner layer;
Li is the second outer liner layer;
L1 is the intermediate liner layer (first intermediate liner layer);
Fi is the corrugated layer immediately above the second outer liner layer Li; and
F1 is the corrugated layer immediately above the intermediate liner layer L1.

As shown in FIG. 2, when subjected to an increasing bending moment M in a direction towards the second outer uncorrugated layer, the first outer uncorrugated layer Lo, forming the outside of the bent structure, is in tension while the second outer uncorrugated layer Li, forming the inside of the bent structure, is in compression. Eventually, the second outer uncorrugated layer Li will fail in compression and will irreversibly buckle along a single line arranged between two flutes of the corrugated layer immediately above the second outer liner layer. A crease line C is thus formed, as shown in FIG. 2.

Immediately that the second outer uncorrugated layer Li fails in this way, the second outer uncorrugated layer Li no longer resists the compression and the board distorts into a part-folded triangular shape, with two straight portions connected by a failed section which is much thinner than the remainder of the board.

When the board is returned to a planar form, the crease line will remain. The crease line represents irreversible or permanent damage to the board, and thus weakening of this portion of the board. A further attempt to bend the board will cause the board simply to fold along this line, as this line will be less resistant to buckling. This line thus forms effectively a hinge or a kink in the board, which cannot be removed, and which permanently weakens a structure made from the board.

In some failure modes, the board will fail at a plurality of lines, separated by several wavelengths of the fluting medium.

In other failure modes, if the second outer uncorrugated layer Li does not buckle at all, the first outer uncorrugated layer Lo may instead break in tension.

Besides the limitation with respect to large radii, a bent conventional corrugated board is not an optimal structure for construction of e.g. packaging since the inner liner (second outer uncorrugated layer) will be much subjected to high stresses, and thus sensitive to deformation.

Accordingly, single-, double- and triple-wall corrugated board are typically formed into rectangular or square boxes (brick-shaped boxes) which, in addition to planar top and bottom, consist of four planar sides.

In the packing of bulk products (e.g. granules), packaging is exposed to high internal pressure, and sometime also exposed to high top-to-bottom loads (e.g. when stacked on top of each other). For such heavy duty applications, multi-layered corrugated boards are often needed to fulfil packaging strength requirements (ECT according to ISO 3037: 2013 and bending stiffness according to ISO 5628:2012).

From a theoretical perspective, the preferred shape to withstand high internal pressure is a cylindrical shape, but it is not typically possible to bend conventional multi-layered corrugated boards into circular shapes of adequately small radii of curvature. Such shapes are thus not typically considered for applications using conventional multi-layered corrugated board. For such packaging applications it has therefore been proposed to use, for example, a structure having eight planar side panels to form an octagon, in order to get closer to a circular shaped design.

SUMMARY OF THE INVENTION

According to a first aspect of the invention, there is provided a corrugated board. The corrugated board has a layered structure. The layered structure comprises a first outer uncorrugated layer defining a first surface of the corrugated board. The layered structure comprises a second outer uncorrugated layer defining a second surface of the corrugated board. The layered structure comprises a plurality of corrugated layers arranged between the first outer uncorrugated layer and the second outer uncorrugated layer. Each corrugated layer has flutes running in the same direction as the other corrugated layers of the plurality of corrugated layers. The layered structure comprises one or more intermediate uncorrugated layers. Each intermediate uncorrugated layer is interposed between and attached to a respective pair of the plurality of corrugated layers. When the corrugated board is bent from a flat state in a first bending direction about a first axis extending along the direction of the flutes, a sequential group of uncorrugated layers selected from the second outer uncorrugated layer and the one or more intermediate uncorrugated layers buckle before the first outer uncorrugated layer buckles. Each layer of the sequential group of uncorrugated layers buckles along a plurality of lines arranged between sequential peaks of an adjacent corrugated layer. When the corrugated board is bent in the first bending direction, the second outer uncorrugated layer becomes the inside of the bent structure and that in the second case the first outer uncorrugated layer becomes the inside of the bent structure.

In one embodiment, when the corrugated board is bent from the flat state in a second bending direction about a second axis extending along the direction of the flutes, either the first outer uncorrugated layer buckles along a single line before the second outer uncorrugated layer buckles or the second outer uncorrugated layer breaks in tension before the first outer uncorrugated layer buckles.

In one embodiment, the sequential group of uncorrugated layers buckle sequentially.

In one embodiment, the sequential group of uncorrugated layers buckle simultaneously.

In one embodiment, the sequential group of uncorrugated layers includes one intermediate uncorrugated layer adjacent to the first outer uncorrugated layer.

In one embodiment, the corrugated board can be bent in the first bending direction to a radius of curvature of five times a thickness of the board measured from the first surface to the second surface before the first outer uncorrugated layer buckles.

In one embodiment, the corrugated board can be bent in the first bending direction to a radius of curvature of two times the thickness of the board before the first outer uncorrugated layer buckles.

In one embodiment, the corrugated layer closest to the first outer uncorrugated layer has a smaller fluting pitch than another corrugated layer.

In one embodiment, the corrugated layer closest to the first outer uncorrugated layer has a smaller fluting pitch than the corrugated layer closest to the second outer uncorrugated layer.

In one embodiment, the first outer uncorrugated layer carries surface ornamentation.

In one embodiment, the second outer uncorrugated layer provides a second surface of the board which is at least one of a liquid-impermeable coating, a gas-impermeable coating, or a coating of an inert material.

In one embodiment, a coating is provided to the second outer uncorrugated layer to form the second surface.

In one embodiment, the first outer uncorrugated layer is a liner board, a carton board, a laminate including liner board, or a laminate including carton board.

In one embodiment, the second outer uncorrugated layer is a polymer layer or a laminate including a polymer layer.

In one embodiment, the neutral plane of bending in the first direction of the board is between the first outer uncorrugated layer and the intermediate uncorrugated layer immediately adjacent to the first outer uncorrugated layer.

In one embodiment, the bending stiffness of each of the second outer uncorrugated layer and the intermediate uncorrugated layer satisfies the equation $EI<(SCT\times\lambda^2)/(4\times\pi^2)$ in which: EI represents the bending stiffness of the layer about the direction of the flutes; SCT represents the compression strength of the layer perpendicular to the direction of the flutes; and $\lambda$ represents the length between two peaks of the adjacent corrugated layer in a radially outward direction relative to the first bending direction.

In one embodiment, the number of intermediate uncorrugated layers is at least 1, 2, 3, 4 or 5.

According to a second aspect of the present invention, there is provided a container, comprising corrugated board being an embodiment of the first aspect, exhibiting at least one curved surface portion.

According to a third aspect of the present invention, there is provided a structure, comprising corrugated board being an embodiment of the first aspect, exhibiting at least one curved surface portion, as a structural component.

Packaging solutions involving shapes other than straight panels improve design freedom, which can result in more attractive packaging structures, or those having improved functionality.

There is a desire for a sheet material which can be formed into a smoothly curved form even at small radii of curvature.

Further, there is a desire to store sheet material in rolls.

Further, there is a desire to improve the design freedom for the designers of packaging.

Embodiments of the present invention provide corrugated boards and containers which address problems with prior art corrugated boards and containers, including meeting one or more of the above desires.

DETAILED DESCRIPTION

Figure 1:
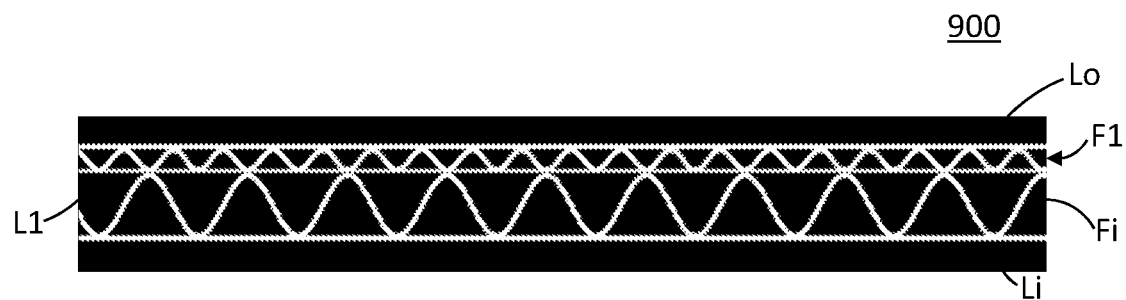
FIG. 1 shows a cross-section view of a conventional double-wall corrugated board in an unloaded state.

Embodiments of the present invention combine known double and triple wall corrugated board constituents, e.g. liner board and fluting medium, in a way that mechanically enables the smooth bending of a multiple-layered corrugated board in one, forward, direction about an axis parallel to the fluting direction (direction along the peaks or troughs of the flutes), while retaining desirable mechanical properties such as resistance to bending in another, reverse, direction about an axis parallel to the fluting direction, resistance to bending in a direction crossing the fluting direction, and compressive strength along the fluting direction.

Smooth bending herein refers to bending into a curved form without visible defects along the outer surface, with respect to the radius of curvature, of the curved board. One definition of smooth bending which may be applied in the present context is that in a cross-section of the outermost layer of the board which changes direction from a first direction to a second direction, the change of direction is gradual over a certain number, for example five, flutes immediately adjacent that outermost layer. In particular, smooth bending to a radius of curvature of two times the thickness of the board, or alternatively 20 mm, may in practice be achieved.

Embodiments of the present invention achieve this by careful selection of the mechanical properties of the various layers of the corrugated board structure in order to fulfil certain principles. By such careful selection of the mechanical properties of the various layers of the corrugated board structure, it becomes possible to bend the board into a smooth curvature. Depending on the configuration of the board selected, radii of curvature as small as twice the thickness of the board become achievable.

In particular, in order to assure that a board can be converted into smooth curvatures in a packaging application while retaining desirable packaging performance, it is appropriate to have regard to the following principles of material selection and construction.

A first embodiment of a multi-layered corrugated board, being a double-walled board according to the invention, is constructed as follows, with reference to FIG. 3.

The embodiment is a double-walled board 100 consisting of two outer uncorrugated layers Lo, Li of sheet material with an intermediate uncorrugated layer of sheet material L1 arranged between the two uncorrugated outer uncorrugated layers Lo, Li, in the manner of a sandwich. Each of these layers is sometimes termed a "liner", and is typically substantially flat when the material is in the unbent state. Separating the liners are corrugated layers, sometimes termed fluted layers, formed of a fluting medium, and each having a defined fluting profile.

In the context of embodiments of the present invention, one outer uncorrugated layer Lo of the board is termed the first or outermost uncorrugated layer, while the other outer uncorrugated layer Li is termed the second or innermost layer. The corrugated layer adjacent the outermost uncorrugated layer is termed the outermost corrugated layer F1 while the corrugated layer adjacent the innermost uncorrugated layer is termed the innermost corrugated layer Fi. This terminology is adopted with reference to the intended behaviour of the board of the present invention, as follows.

Figure 4:
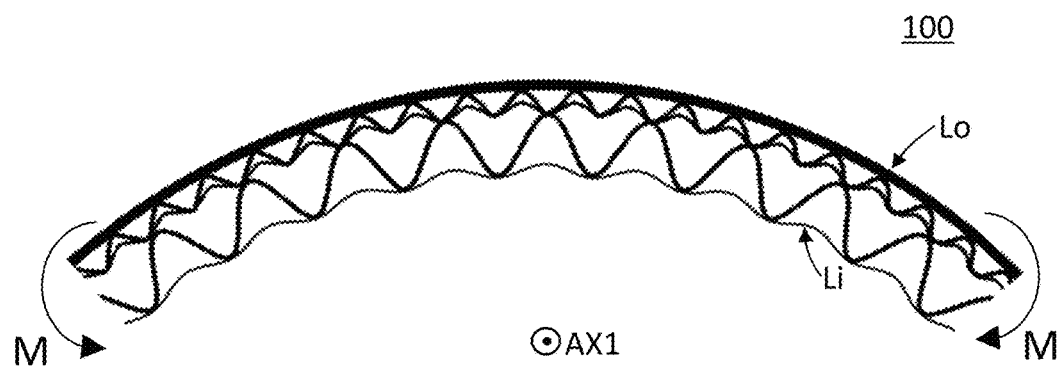
FIG. 4 shows a cross-section view of the double-wall corrugated board shown in FIG. 3 subjected to a bending moment (M) resulting in a smoothly curved shape.
Figure 5:
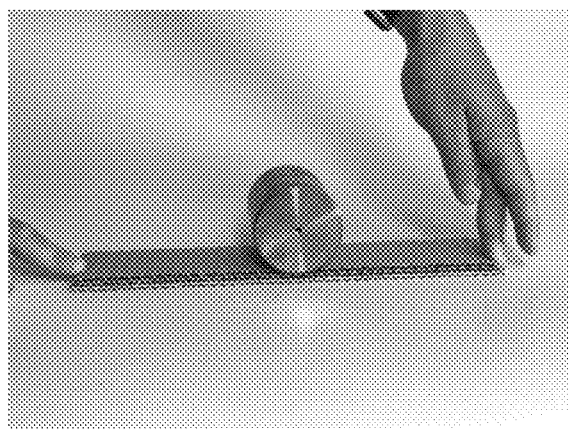
FIGS. 5-10 show a process of testing the ability to bend of a triple-wall corrugated board being an embodiment of the invention.
Figure 6:
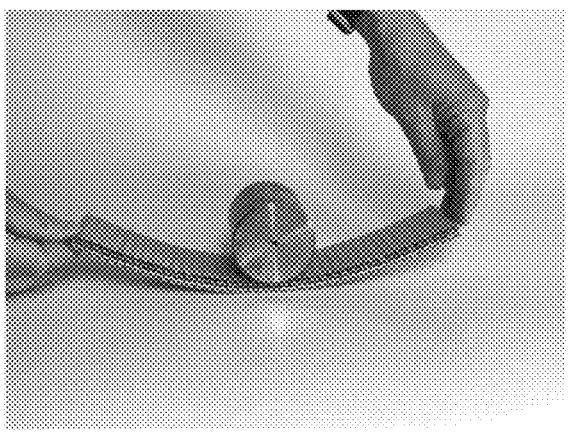
Figure 7:
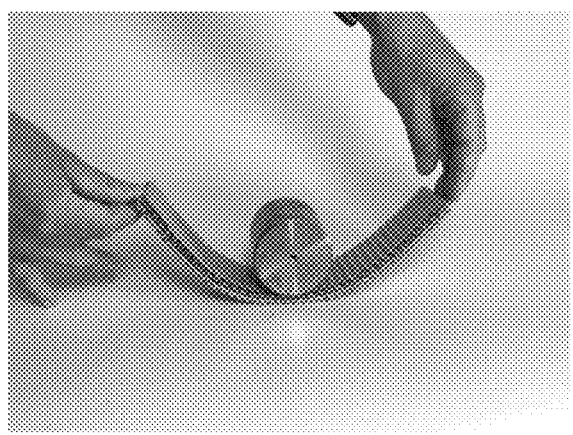
Figure 8:
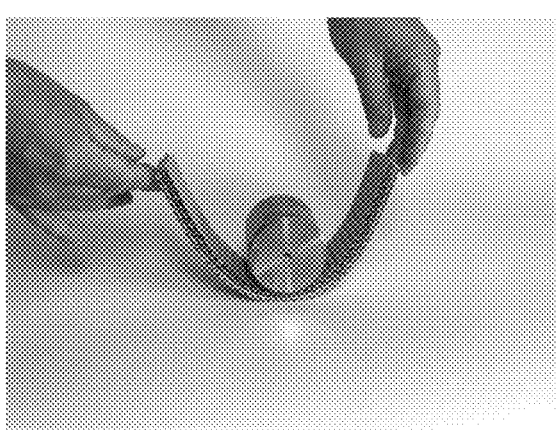
Figure 9:
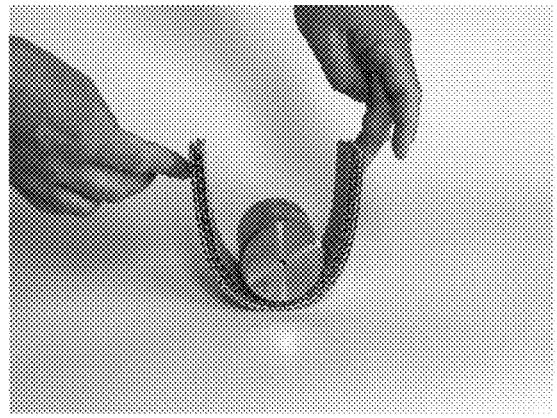
Figure 10:
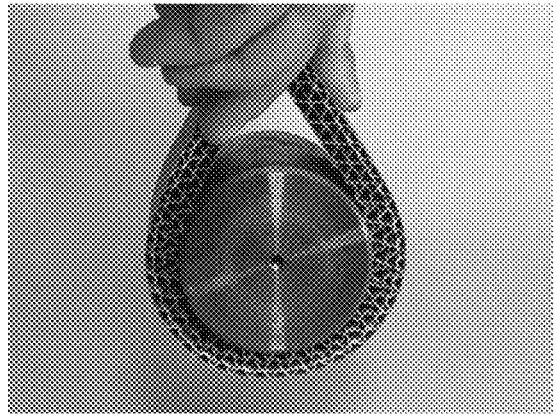
Figure 11:
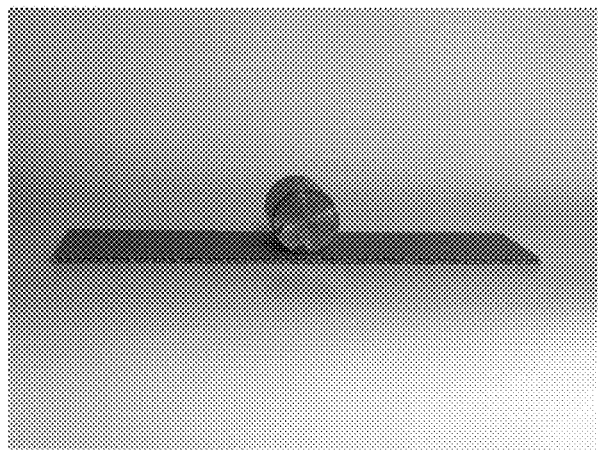
FIGS. 11-16 show a process of testing the ability to bend of a conventional double wall board, presented as a comparative example.
Figure 12:
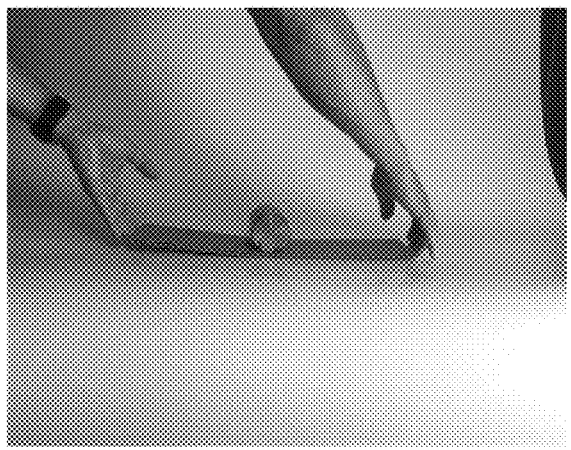
Figure 13:
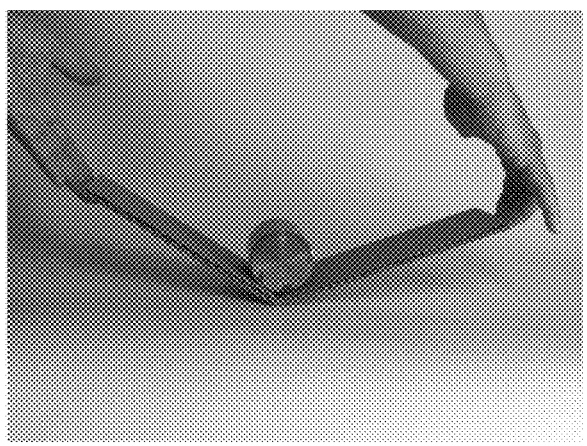
Figure 14:
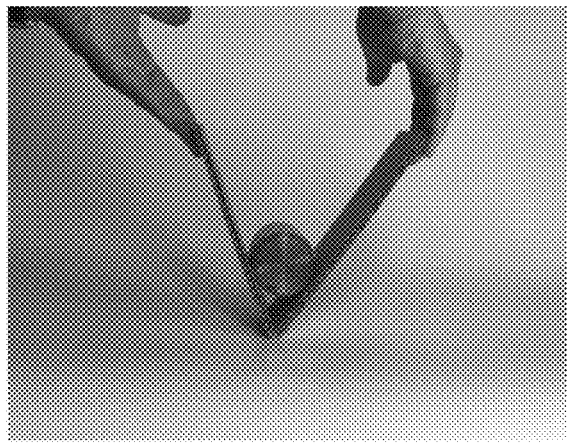
Figure 15:
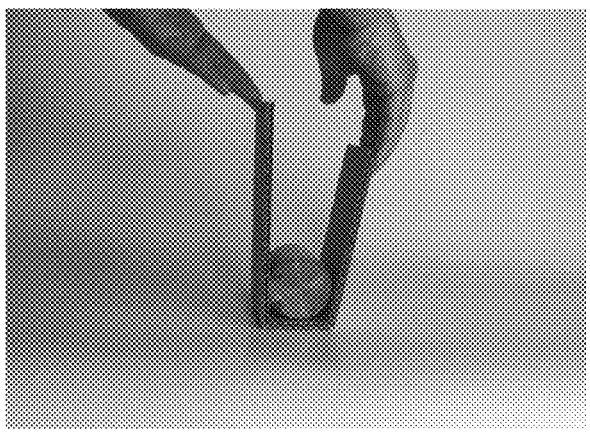
Figure 16:
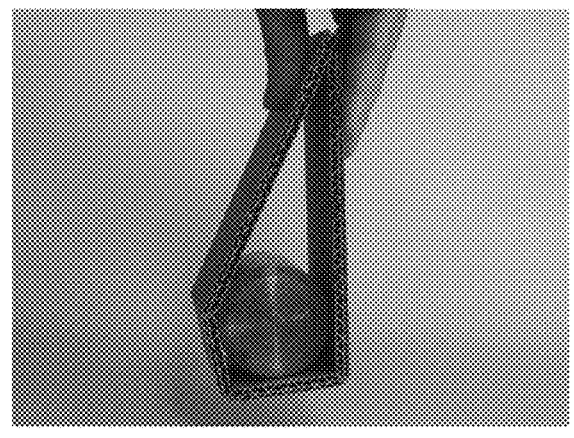
Figure 17:
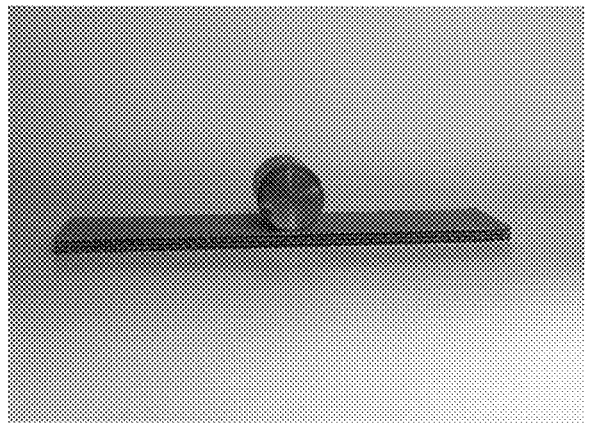
FIGS. 17-22 show a process of testing the ability to bend of a conventional triple wall board, presented as a comparative example.
Figure 18:
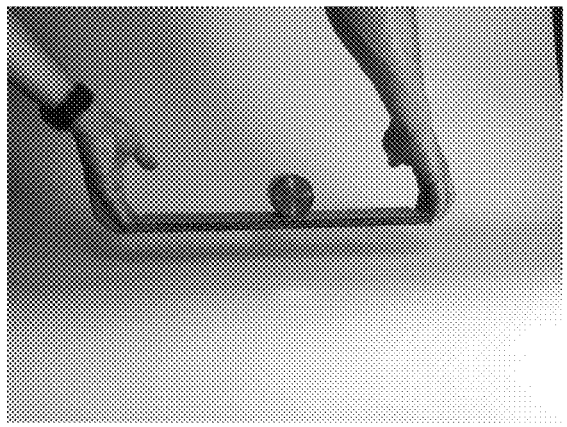
Figure 19:
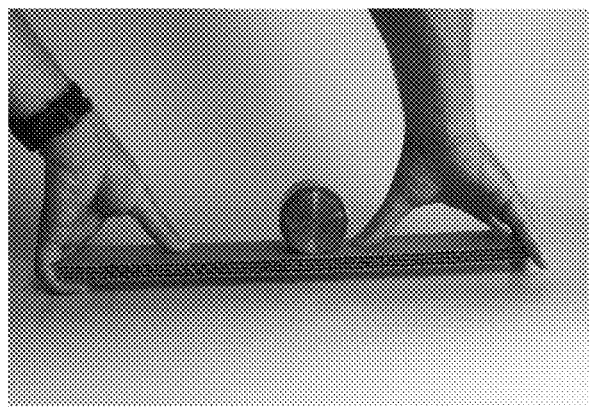
Figure 20:
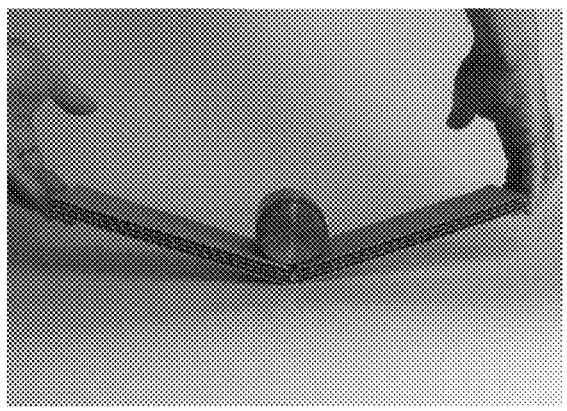
Figure 21:
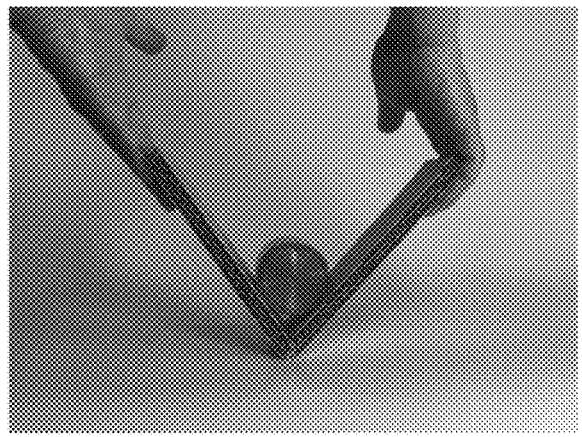
Figure 22:
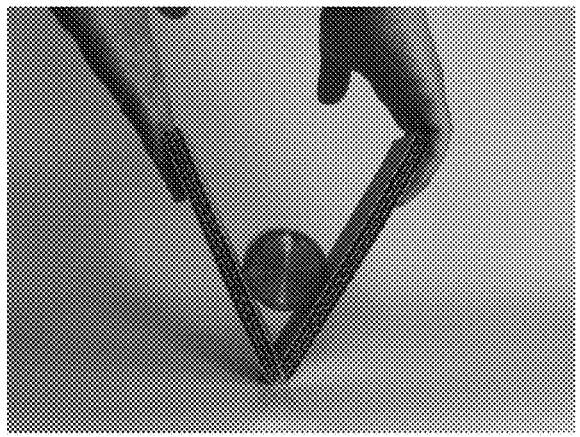

In the embodiment, the board may be smoothly bent in a first bending direction into a curved form, as shown in FIG. 4.

Such a first bending direction is around an axis of curvature AX1 outside of the board and closer to the second uncorrugated layer Li of the board than the first uncorrugated layer Lo of the board. In other words, when the board is bent in the first bending direction, the first uncorrugated layer of the board is outermost and the second uncorrugated layer is innermost with reference to the radial direction from the axis of curvature. However, in the embodiment, the board will tend to resist bending in a second direction around an axis on the other side of the board, outside of the board and closer to the first uncorrugated layer of the board than the second uncorrugated layer of the board. In this regard, the embodiment is considered to be one-way smoothly bendable, into a curved form with the first uncorrugated layer outermost of the curve and the second uncorrugated layer innermost of the curve, as compared with a two-way bendable structure which can be bent in forward and reverse directions.

Figure 2:
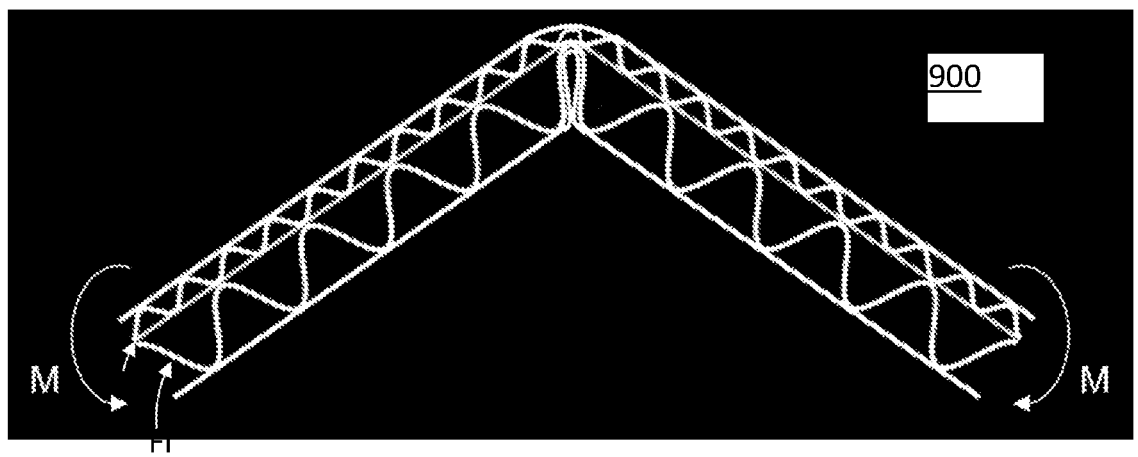
FIG. 2 shows a cross-section view of a conventional double-wall corrugated board subjected to a bending moment (M), high enough to cause damage to the material.

As discussed above with regard to FIG. 2, when a conventional board is bent, the outermost uncorrugated layer attempts to resist the induced tension, the innermost uncorrugated layer attempts to resist the induced compression, but eventually the innermost uncorrugated layer fails by buckling irreversibly along a single line.

In contrast, in embodiments of the present invention, the innermost uncorrugated layer is selected to have a deliberately lowered bending stiffness EI and increased flexibility such that when the innermost uncorrugated layer is placed under compression, it does not resist the compressive forces, but rather buckles simultaneously and reversibly between each flute of the adjacent innermost corrugated layer Fi. This is distinctly different to the conventional wisdom in forming conventional double-walled corrugated board, in which outer uncorrugated layers which are strong in compression are preferred.

When each section of the second outer uncorrugated layer Li between two successive peaks of the innermost corrugated layer Fi to which the second outer uncorrugated layer Li is attached exhibits buckling, the bending is distributed across each section of the material.

The buckling of a layer of sheet material, such as the second outer uncorrugated layer Li, can theoretically be described by the so-called "Euler's fourth case of buckling", according to Equation 1 below.

$$Pk = \frac{4\pi^2 EI}{\lambda^2} \quad \text{Equation 1}$$

in which Pk is the buckling force, being the compressive load when the material begins to buckle; EI is the bending stiffness of the layer; and λ is the length between two successive peaks of the innermost corrugated layer to which the outer uncorrugated layer is attached.

Here, and below, the quantity bending stiffness EI:
  E is determined according to ISO 1924-3:2005 by a conventional tension test; and
  I is a cross-sectional factor derived from the thickness and width of the sample.

Specifically, for a rectangular cross-section (such as paper), $I=(b\times h^3)/12$, in which quantity b is the width of sample and h is the thickness determined according to ISO 3034:2011. In the present context, however, the property I is understood as being per unit width, that is, $I=h^3/12$.

Reducing the bending stiffness of the material of the second outer uncorrugated layer Li, or alternatively increasing the length between two successive peaks of the innermost corrugated layer Fi to which the second outer uncorrugated layer Li is attached, will tend to decrease the force Pk at which the second outer uncorrugated layer Li will begin to buckle.

However, if the second outer uncorrugated layer Li has too high a compressive strength SCT, which may be measured according to ISO 9895:2008, the second outer uncorrugated layer Li will not reversibly buckle at each section of the second outer uncorrugated layer Li between two successive peaks of the innermost corrugated layer Fi to which the second outer uncorrugated layer Li is attached, but will rather tend to fail by irreversible buckling at a single location.

To ensure that the buckling occurs almost simultaneously for each section of the second outer uncorrugated layer Li between two successive peaks of the innermost corrugated layer Fi to which the second outer uncorrugated layer Li is attached, the force Pk at which the second outer uncorrugated layer Li will begin to buckle according to Euler's 4th case of buckling should be less than the material's compressive strength. The relationship is given in Equation 2 below.

$$Pk < SCT \quad \text{Equation 2}$$

From this criterion, a relationship may be obtained according to which the second outer uncorrugated layer Li will buckle almost simultaneously in each section of the second outer uncorrugated layer Li between two successive peaks of the innermost corrugated layer Fi to which the second outer uncorrugated layer Li is attached. This relationship relates the bending stiffness EI of the second outer uncorrugated layer Li to the short-span compressive strength SCT, taking into account the length λ between two successive peaks of the innermost corrugated layer Fi to which the second outer uncorrugated layer Li is attached, as given in Equation 3 below.

$$EI_{second\ outer\ layer} < \frac{SCT \cdot \lambda^2}{4\pi^2}. \quad \text{Equation 3}$$

Once the requirement of Equation 3 is met, it can be assured that, when bent appropriately in a first direction, the second outer uncorrugated layer Li will not fail by buckling along a single fold line, but rather will buckle almost simultaneously in each section of the second outer uncorrugated layer Li between two successive peaks of the innermost corrugated layer Fi to which the second outer uncorrugated layer Li is attached, thereby permitting the corrugated board to adopt a smoothly curved form.

It is noted that in the above, it has been mentioned that second outer uncorrugated layer Li will buckle almost simultaneously in each section of the second outer uncorrugated layer Li between two successive peaks of the innermost corrugated layer Fi to which the second outer uncorrugated layer Li is attached. However, it is permitted that occasionally some sections will not buckle. The advantageous results of the embodiment can be obtained even when not all sections buckle, but rather a majority, for example, greater than 50%, greater than 70%, or greater than 90% in a bend region of the board buckle. However, in most embodiments, it is expected that all or substantially all sections will buckle simultaneously or almost simultaneously. A bending region is defined as the region wherein the overall planar direction of the board changes from a first direction to a second direction, for example between a first flat section and a second flat section having an angle between them. The bending region may include, for example, at least five flutes, at least ten flutes, or at least twenty flutes of the innermost corrugated layer Fi. The angle between the first and second flat regions may involve a change in direction of at least 30 degrees, at least 45 degrees, or at least 90 degrees.

Further, to ensure that the first outer uncorrugated layer Lo bends smoothly, the bending stiffness should not be so great that at the desired bending radius the first outer uncorrugated layer fails in bending, and breaks or creases instead. In other words, the flexural strength of the first outer uncorrugated layer should be sufficient to allow the first outer uncorrugated layer to adopt a desired radius of curvature without failing. However, for most materials suitable for use as an outer uncorrugated layer of a corrugated board, this criterion is likely already to be satisfied.

In order to inhibit a bending of the board in a second bending direction opposite to the first bending direction, it is preferable that the bending stiffness of the first outer uncorrugated layer Lo is higher than the bending stiffness of the second outer uncorrugated layer Li. Further, it is preferable that the EI value for the first outer uncorrugated layer should be greater than the value obtainable from Equation 3, with reference to the short-span compressive strength SCT of the first outer uncorrugated layer Lo, taking into account the length λ between two successive peaks of the outermost corrugated layer F1 to which the first outer uncorrugated layer Lo is attached. The second outer uncorrugated layer Li should also be sufficiently strong in tension (has sufficient tensile strength) as to avoid breaking under bending in the reverse direction. Appropriate choice of material parameters, and particularly of the values for length λ, EI and SCT will ensure that the board will not smoothly bend in the second bending direction, but rather will remain stiff and resist bending, at least until it fails in the same way as the conventional single-wall corrugated board.

The principles given above are explained in greater detail with regard to a smoothly-bendable single-walled corrugated board in Applicant's earlier application PCT/SE2012/050321, published as WO 2013/141769 A1, the contents of which are hereby incorporated by reference to the extent permitted by law.

Figure 3:
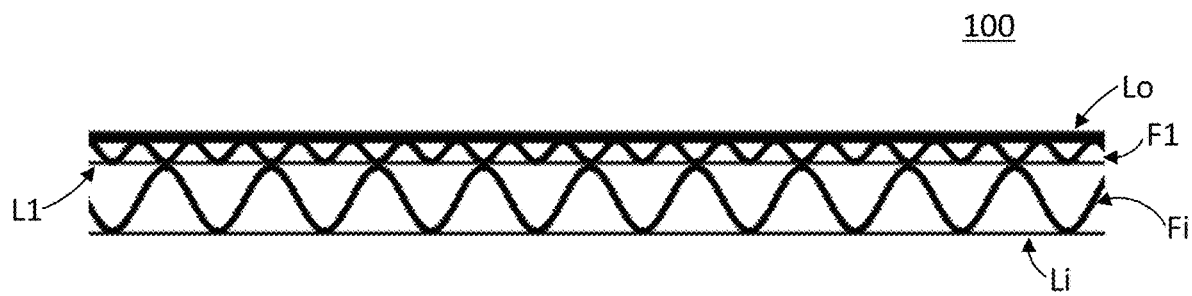
FIG. 3 shows a cross-section view of a double-wall corrugated board being an embodiment of the present invention in an unloaded state

However, the principles set out above do not yet take account of the presence of an intermediate uncorrugated layer L1 and further outermost corrugated layer F1 which exist in a double-walled construction as shown in FIGS. 3 and 4. With the presence of intermediate uncorrugated layer L1, there is a possibility that even if the second outer uncorrugated layer Li buckles almost simultaneously for each section of the second outer uncorrugated layer Li between two successive peaks of the innermost corrugated layer Fi to which the second outer uncorrugated layer Li is attached, the intermediate uncorrugated layer L1 also fails by buckling along a single line. Alternatively, there is a possibility that the first outer uncorrugated layer Lo is placed into excessive tension due to stiffness of the intermediate uncorrugated layer L1. Hence, it is not generally straightforward to extend the teaching of WO 2013/141769 A1, which relates to a single-wall construction, to a double-wall or multi-layer construction.

In order to ensure that the presence of the intermediate uncorrugated layer L1 allows the double layer of FIG. 3 to smoothly bend into a desired radius, it should be ensured that intermediate uncorrugated layer L1 also buckles almost simultaneously for each section of the intermediate uncorrugated layer L1 between two successive peaks of the outermost corrugated layer F1 to which the intermediate uncorrugated layer L1 is attached.

Accordingly, the principles applied in Equation 3 should be adopted for the intermediate uncorrugated layer L1 also, in terms of the EI value for the intermediate uncorrugated layer L1 being less than the value obtainable from Equation 3, with reference to the short-span compressive strength SCT of the intermediate uncorrugated layer L1 and taking into account the length λ between two successive peaks of the innermost corrugated layer F1 to which the intermediate uncorrugated layer L1 is attached.

Figure 23:
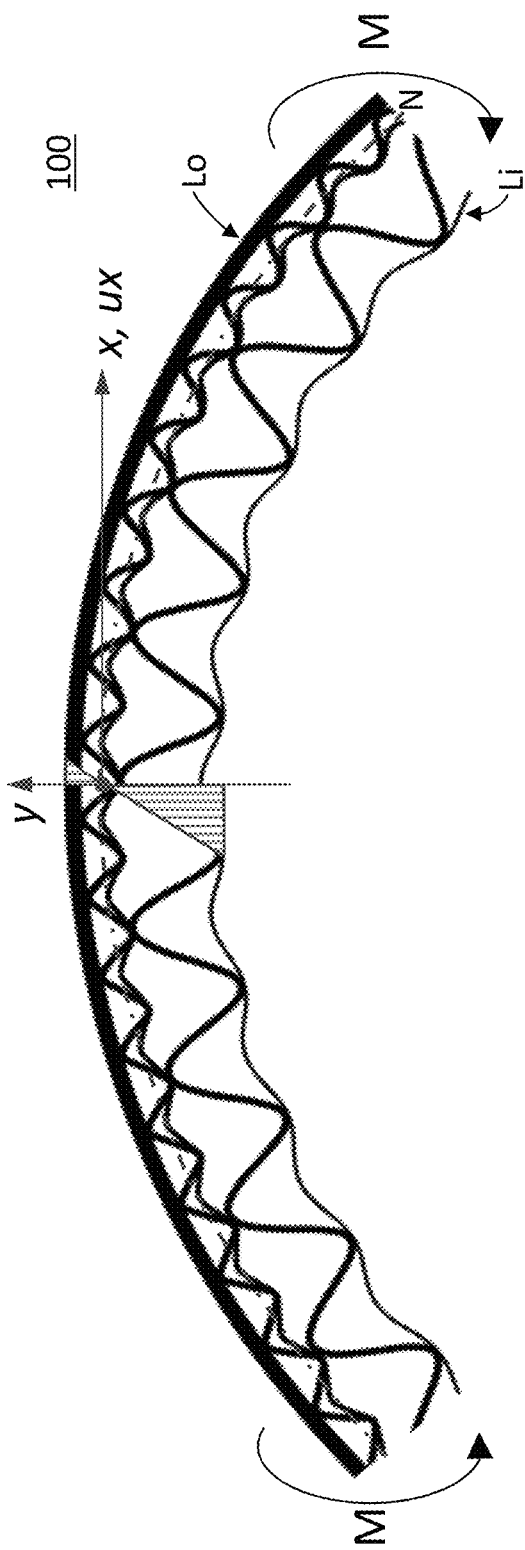
FIG. 23 shows a cross-sectional view of a double-wall corrugated board being an embodiment of the present invention subjected to a bending moment (M).

Further, it should be ensured that intermediate uncorrugated layer L1 is not placed in tension in the bending, but rather is in compression when the board is bent in the first direction. To allow this, the combination of layers in the corrugated board is chosen so that the neutral plane N is below the outer liner but above the intermediate uncorrugated layer of the corrugated board. The neutral plane is that plane of the board where no compression or extension occurs when subjected to bending. When the board is bent, all material above the neutral plane is subjected to tensile stresses and all material below the neutral plane is subjected to compressive stresses. This principle is demonstrated in FIG. 23. The position of the neutral plane N may be varied by adjusting the elastic modulus and thickness of the individual uncorrugated layers and corrugated layers and the height of the flutes.

Figure 28:
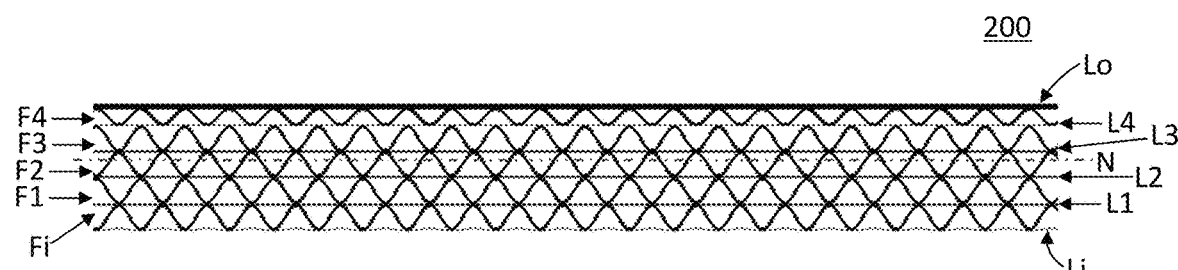
FIGS. 28 to 33 show a process of bending an elevenlayered bendable corrugated board in which the layers on the inside of the bend buckle sequentially as the board is bent.
Figure 29:
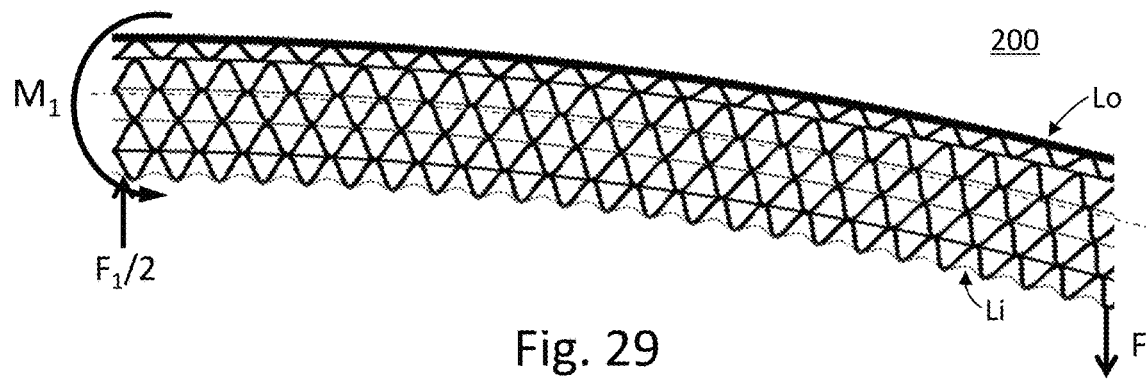
Figure 30:
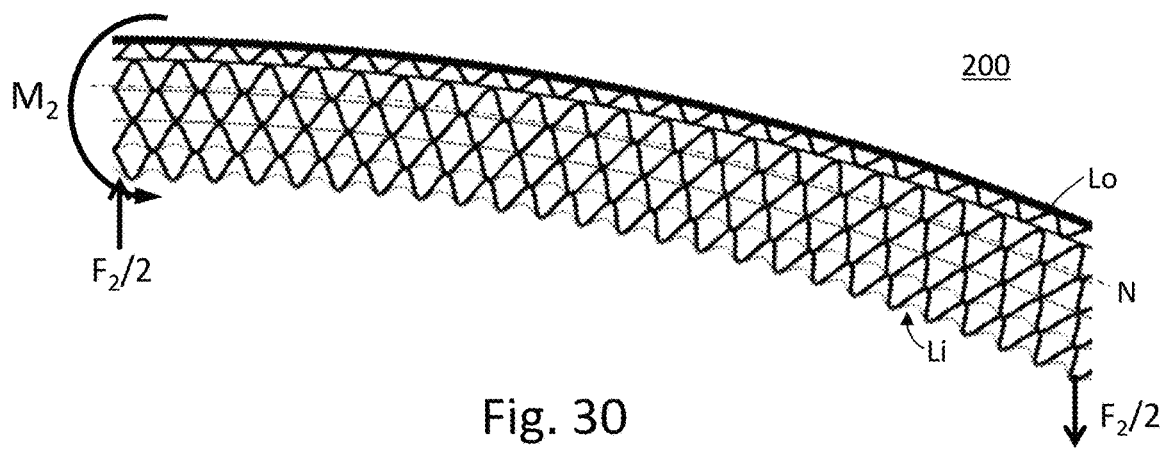
Figure 31:
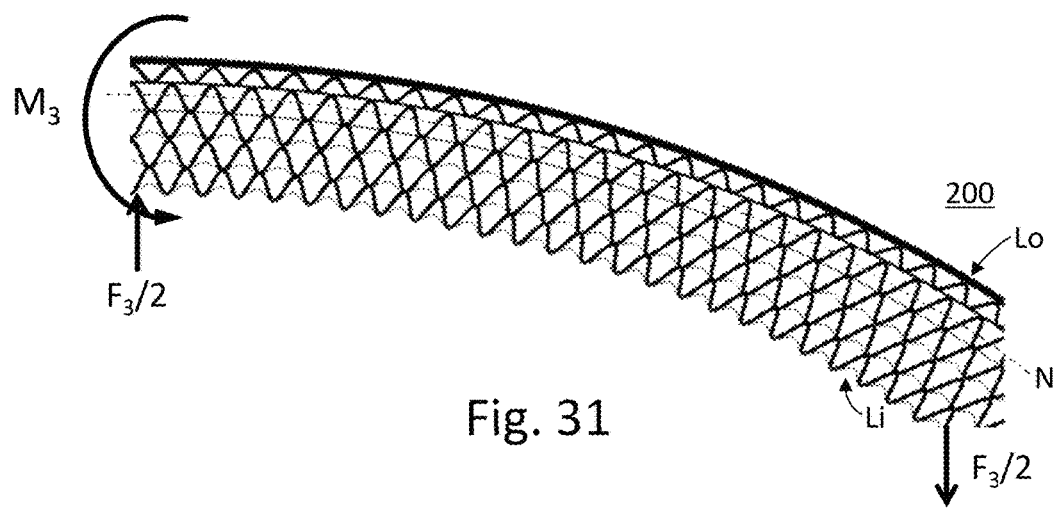
Figure 32:
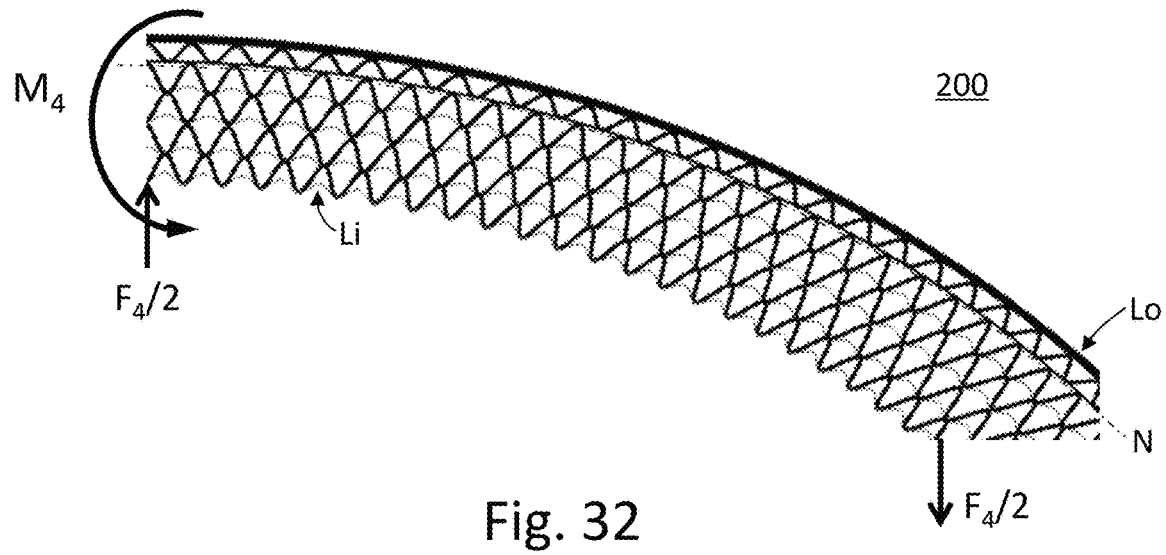
Figure 33:
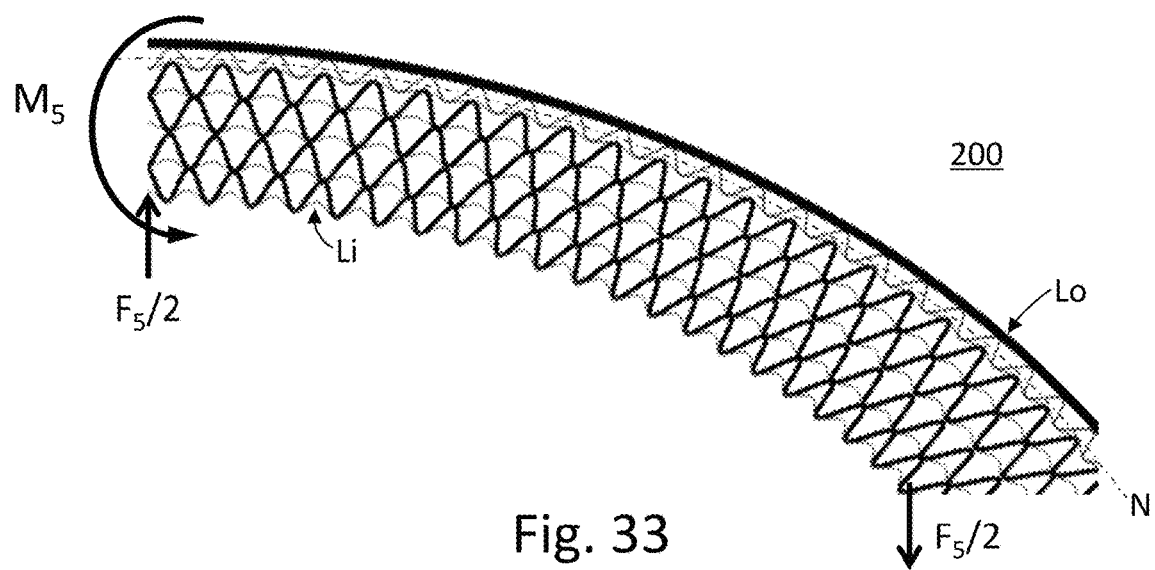

The above teaching relating to a double-walled board is extensible to the case of multi-walled boards, having an outermost layer Lo, an innermost layer Li, and a plurality of intermediate uncorrugated layers Ln (where n=1, 2, 3, 4, 5 . . . ) arranged in sequence from the innermost layer Li to the outermost layer Lo. Between each intermediate uncorrugated layer Ln and the similar layer immediately above that intermediate uncorrugated layer is an intermediate corrugated layer Fn, So for example, for a five-walled board 200, as shown in FIG. 28, having five corrugated layers and four intermediate uncorrugated layers, the sequence of layers could be noted as Li-Fi-L1-F1-L2-F2-L3-F3-L4-F4-Lo.

Figure 24:
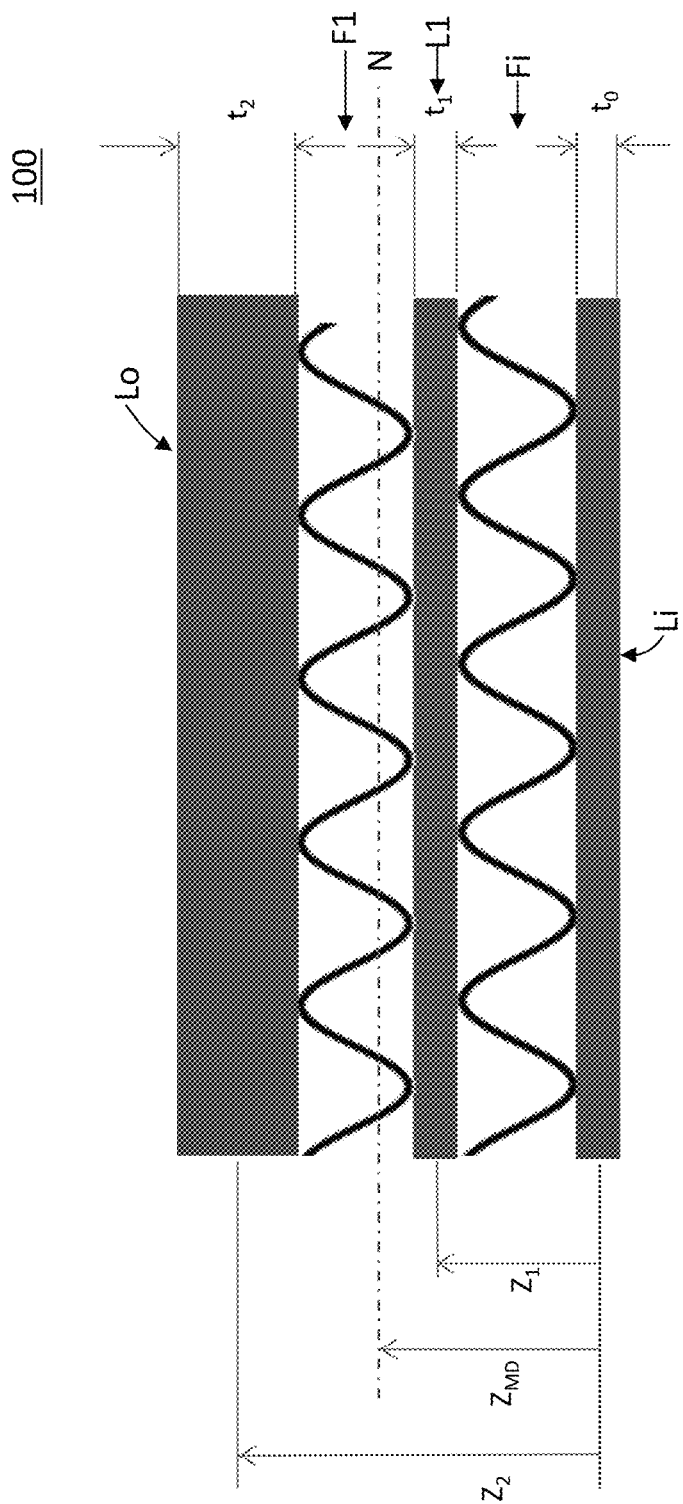
FIG. 24 shows a cross-sectional view of a double-wall corrugated board displaying measurements useful for understanding Equation 4 and Equation 5 given below.

From the application of beam theory to a multi-layered material, the location of the neutral plane of a given unbent corrugated board can be determined by determining the neutral plane for a given layer by Equation 4, and then performing a sum over all layers as given in Equation 5:

$$Z_{i,liner} = Z_{i-1,liner} + \frac{t_{i-1,liner}}{2} + h_{i-1,flute} + t_{i-1,fluting} + \frac{t_{i,liner}}{2} \quad \text{Equation 4}$$

$$Z_{MD} = \frac{\sum_i E_{MD,i,liner} \cdot Z_{i,liner}}{\sum_i E_{MD,i,liner}} \quad \text{Equation 5}$$

where $Z_{MD}$ is the distance from the innermost uncorrugated layer to the neutral plane, E and t are the elastic modulus and thickness of the individual uncorrugated layers and corrugated layers and h is the height of the flutes. The quantities shown in these equations are demonstrated in FIG. 24.

However, an embodiment of the claimed invention is attainable even when the above theoretical considerations are not satisfied. Provided that the bending stiffness of the inner liners are sufficiently low enough to buckle between the flute tops, it is not strictly necessary to arrange the neutral plane between the outermost layer Lo and the outermost intermediate uncorrugated layer. In particular, a multi-layered board having the neutral plane below the outermost intermediate uncorrugated layer may still attain a smooth radius on bending to a small radius.

In such a configuration, as the bending process starts, the innermost uncorrugated layer (or the innermost group of uncorrugated layers) will be exposed to the highest compressive stresses and will buckle between the peaks of the adjacent corrugated layer. When it does so, it will lose stiffness. When this happens, the innermost uncorrugated layer no longer contributes substantially to the position of the neutral plane. The neutral plane therefore moves upwards towards the outermost uncorrugated layer. The new position of the neutral plane can be determined from Equation 4 and Equation 5 but now disregarding the contribution of the innermost uncorrugated layer.

This phenomenon will in some configurations proceed to adjacent uncorrugated layers progressively, as the layers sequentially buckle from innermost to outermost, provided that after each uncorrugated layer has buckled, the neutral plane is displaced to a position allowing the smooth bending of the board to continue. Straightforward experimentation using known materials will allow boards exhibiting this behaviour to be achieved in practice.

FIGS. 28 to 33 show a process of bending an eleven-layered, that is, five-wall bendable corrugated board 200, in which the uncorrugated layers on the inside of the bend buckle sequentially as the board is bent according to the above-described process.

Progressive buckling, in this regard, can refer to each uncorrugated layer buckling in turn from innermost outwardly, or can refer to the uncorrugated layers buckling in groups, each group buckling simultaneously or almost simultaneously. In the bent configuration, the result will be the same; the innermost uncorrugated layers will all be buckled between the points of attachment of the respective corrugated layers, and the outermost uncorrugated layer will be smoothly curved.

If the outermost group of corrugated layers, relative to the bending direction, are sufficiently thin, the associated uncorrugated layers need not buckle at all. In such a configuration, the outermost group of corrugated layers, and their associated uncorrugated layers, are acting together like a (relatively thick) uncorrugated layer. However, such a configuration is exceptional, and in most configurations all uncorrugated layers, or at least all but one of the uncorrugated layers, inward of the outermost uncorrugated layers, will buckle in bending.

Accordingly, extensive variation in the construction of the disclosed multi-layered board may be adopted along the above principles and variations on the same, without undue effort, once these principles are adopted.

In particular, it is sufficient in order to permit bending in a first bending direction that when the corrugated board is bent from a flat state in the first bending direction, a sequential group of uncorrugated layers selected from the second outer uncorrugated layer and the one or more intermediate uncorrugated layers buckle before the first outer uncorrugated layer buckles, each layer of the sequential group of uncorrugated layers buckling along a plurality of lines arranged between sequential peaks of an adjacent corrugated layer.

In some embodiments, each uncorrugated layers of the sequential group of uncorrugated layers buckles along a majority of lines arranged between sequential peaks of an adjacent corrugated layer in a bend region of the corrugated board. The majority may be more than 50%, more than 70%, more than 90% of the lines arranged between sequential peaks of an adjacent corrugated layer in the bend region. In other embodiments, each uncorrugated layers of the sequential group of uncorrugated layers buckles along all lines arranged between sequential peaks of an adjacent corrugated layer in a bend region of the corrugated board Further, to resist bending in the second direction, it is sufficient that when the corrugated board is bent from the flat state in a second bending direction about a second axis extending along the direction of the flutes, the first outer uncorrugated layer either buckles along a single line before the second outer uncorrugated layer buckles or the second outer uncorrugated layer breaks in tension before the first outer uncorrugated layer buckles.

In embodiments of the invention, it is preferred that the fluting direction is aligned as between the corrugated layers. However, in other embodiments on the invention, some misalignment of the fluting direction from one corrugated layer to the next is permissible, provided that all fluting directions are within a small range, for example less than 5 or 10 degrees between the fluting direction of the most misaligned corrugated layers.

Figure 25:
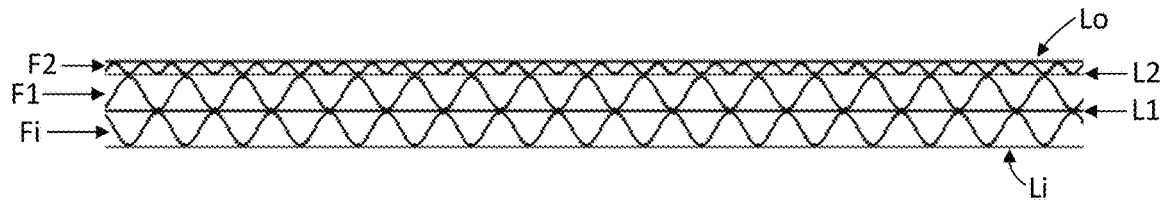
FIG. 25 shows a first example of a triple-wall corrugated board being an embodiment of the invention in which adjacent flutes with same wavelength meet top to top.

In embodiments of the invention, it is preferred that adjacent corrugated layers are of the same wavelength and the corrugated layers are arranged flute top to flute top, such that the peaks of one corrugated layer align with the troughs of an adjacent corrugated layer, as shown in FIG. 25. Such a configuration allows higher resistance to out-of-plane compressive loads.

Figure 26:
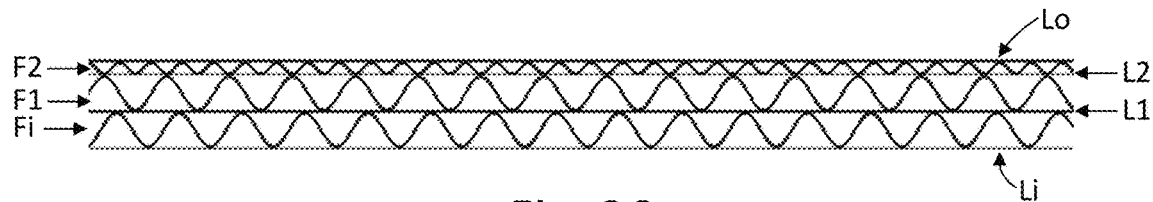
FIG. 26 shows a second example of a triple-wall corrugated board being an embodiment of the invention in which adjacent flutes with same wavelength are slightly shifted in a direction across the direction of the flutes.
Figure 27:
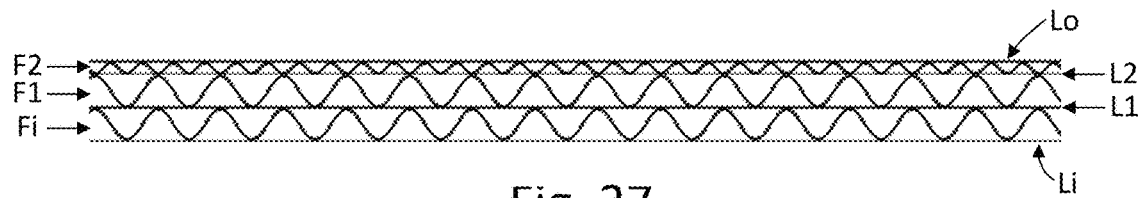
FIG. 27 shows a third example of a triple-wall corrugated board being an embodiment of the invention in which adjacent flutes with same wavelength are fully shifted in a direction across the direction of the flutes.

However, when the flute tops are slightly shifted as between the corrugated layers, as shown in FIG. 26, or completely shifted, as shown in as in FIG. 27, such that the peaks of one layer align with the peaks of an adjacent layer, the resistance to out-of-plane compressive loads will tend to be decreased. Such a shift in adjacent corrugated layers will not negatively affect the ability to bend smoothly to a small radius. However, the thickness of the curved part of the board will depend on how the flute tops are shifted. The largest thickness of the curved part of the board occurs when flute tops are glued towards flute tops in adjacent corrugated layers.

Further, adjacent corrugated layers need not be of the same wavelength, and in practice can therefore move in and out of phase with the flutes of adjacent layers.

In embodiments of the invention, the material of the outer uncorrugated layers and the intermediate uncorrugated layers (i.e. the liners) can be liner board, carton board, paper or plastic or a laminate of any two or more of these materials.

In particular, such uncorrugated layers may be made up of one of a fine paper, supercalendered paper, machine-glazed paper, greaseproof paper, newsprint or machine-finished paper, liner, metal foil, metalized film or a composite material or a laminate of any two or more of a fine paper, supercalendered paper, machine-glazed paper, greaseproof paper, newsprint or machine-finished paper, liner board, metal foil, metalized film or a composite material such as cellulose fibre reinforced polymers (e.g. including nanocellulose). The same group of materials can be used to form the corrugated layers.

In certain embodiments, one or both of the uncorrugated layers and the corrugated layers are made of fibre-based materials.

In certain embodiments, one or both of the uncorrugated layers and the corrugated layers are made of polymer-based materials.

In the above, embodiments having up to five layers of corrugated layers have been proposed. However, in practice, embodiments having up to at least 31 layers have been achieved, and the principles are extensible to even greater numbers of layers.

In embodiments of the invention, the corrugated layers may comprise any of the standard flute profiles A, B, C, D, E, F, G or K, and in some embodiments may comprise any other flute profiles (besides the ones listed above) beyond standard flute profile E, or non-standard flute profiles.

One test to determine whether a given corrugated board 300 can be converted into smooth curvatures is given as follows.

Step 1: put a cylinder Y with a diameter of five times thicker than the board 300 on a flat sheet of the corrugated board with dimensions 1.5 times the circumference of the cylinder Y in length and 50 mm in width. The bendable corrugated board 300 should be placed with the inner uncorrugated layer Li facing upwards and the cylinder Y should be placed gently on the surface without crushing the fluting.

Step 2: lift the length-direction ends of the corrugated board 300 by hand until the ends of the board meet in the air and hold in this configuration. The cylinder Y should have sufficient mass to allow this configuration to be achieved, for example, for example, 1.5-2 kg.

Step 3: inspect the form of the outer uncorrugated layer Lo in this configuration.

If the outer uncorrugated layer Lo smoothly forms at least a half circle around the metal cylinder Y, it can be assured that the board can be converted into smooth curvatures in a packaging product.

When the above test is applied to an example of a triple wall corrugated board 300 according to the invention, the outer uncorrugated layer smoothly forms at least a half circle around the metal cylinder Y. Accordingly, it can be assured that the board can be converted into smooth curvatures in a packaging product. FIGS. 5-10 depict such a test.

In contrast, when the above same test is applied to conventional double and triple wall corrugated board, the outer uncorrugated layer fails to smoothly form at least a half circle around the metal cylinder Y. Accordingly, it cannot be assured that the board can be converted into smooth curvatures in a packaging product. FIGS. 11-16 depict such a test on a conventional double wall board. FIGS. 17-22 depict such a test on a conventional triple wall board.

Figure 34:
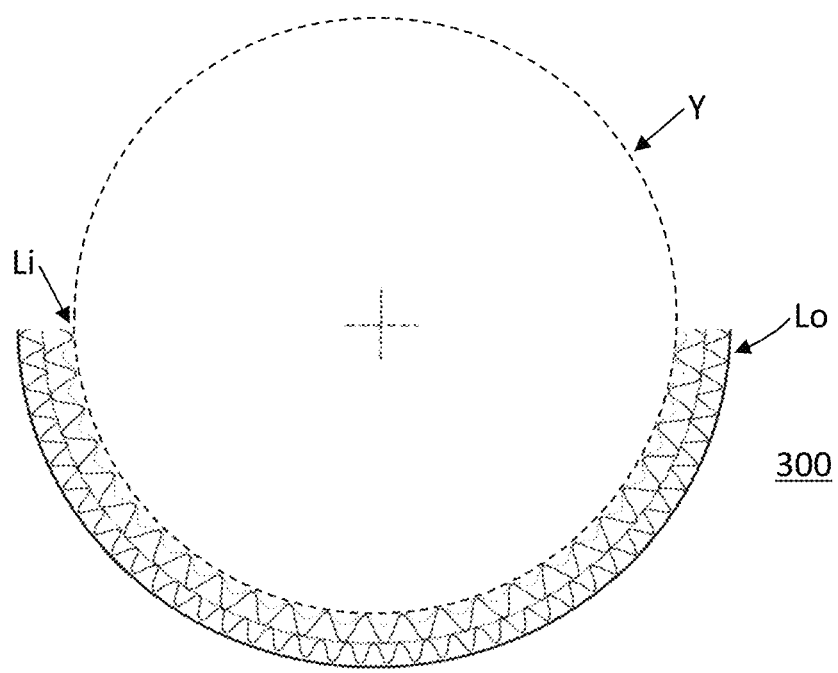
FIG. 34 shows a condition in which a bending test is passed.
Figure 35:
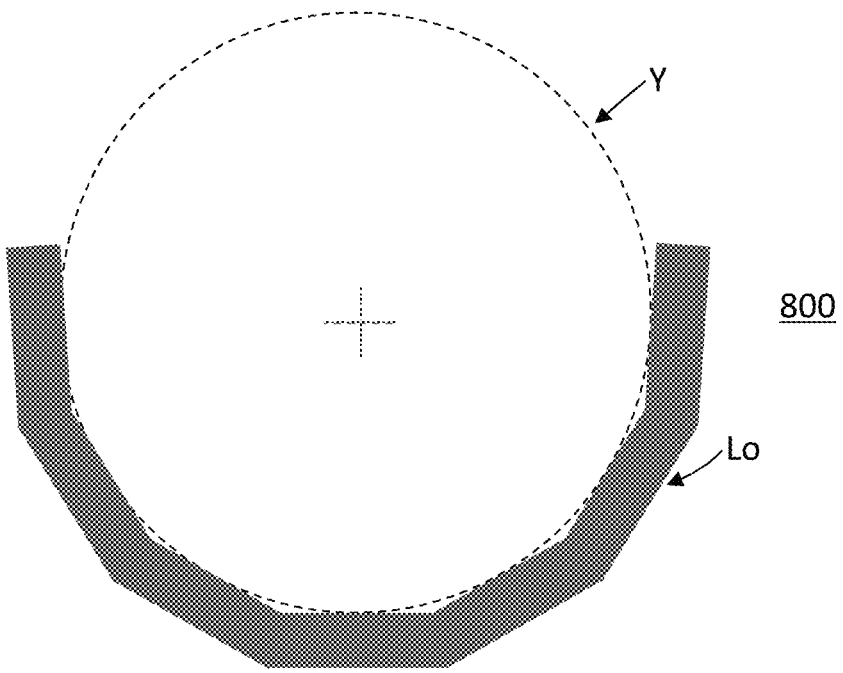
FIG. 35 shows a condition in which a bending test is failed.

To pass this bending test, the outer surface of the board which is located in the bottom half circle of the cylinder Y should form a continuous curvature free from kinks. Also, no visual gaps should been seen between the inner flute tops and the cylinder. Such a state is shown in FIG. 34. A board 800 that fails the test shows an outer surface Lo which is piecewise linear and with clear kinks. Such a state is shown in FIG. 35.

The above test is a convenient way to determine that a given corrugated board can be converted into smooth curvatures in a packaging product. However, even if the test fails, it might be possible to bend the board into a smooth curvature at another radius, which remains significantly below the possible bending radius of conventional corrugated board. Accordingly, failure to perform in the given test does not necessarily exclude a particular corrugated board as an embodiment of the invention. However, if the test succeeds, it may be confirmed that the corrugated board is an embodiment of the invention.

Corrugated board which is an embodiment of the invention can be formed into new and advantageous packaging designs with highly efficient material utilization.

In particular, curved structures typically exhibit improved BCT (top-to-bottom compressive strength, defined according to Fefco 50). A curved shaped panel is also beneficial in horizontal shear which relates to stability in transit. A package having for example a cylindrical shape or an oval shape would accordingly provide a high BCT value and perform well in transport testing.

Furthermore, curved panels or rounded edges prevent the packaging construction to twist, which improves handling aspects.

Depending on product application and packaging design, significant material savings can be achieved while retaining the same stacking strength as for applications using conventional multi-layered corrugated board. For example, by introducing curved edges between adjacent side panels, it is possible to keep a high grammage outer uncorrugated layer to provide a high quality print surface and minimize the grammage of the inner uncorrugated layer while still keeping the stacking strength.

Figure 36:
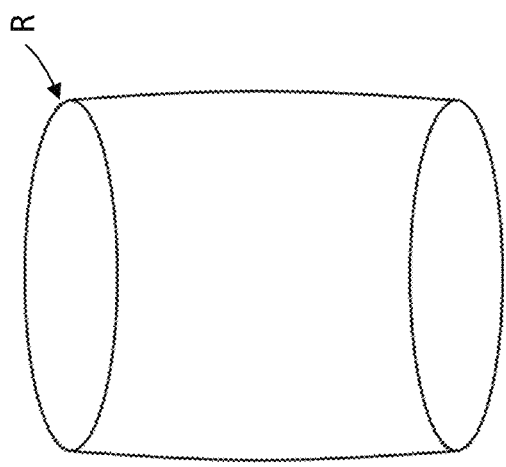
FIG. 36 compares a non-bulging cylinder on the left with a bulging cylinder on the right.
Figure 36:
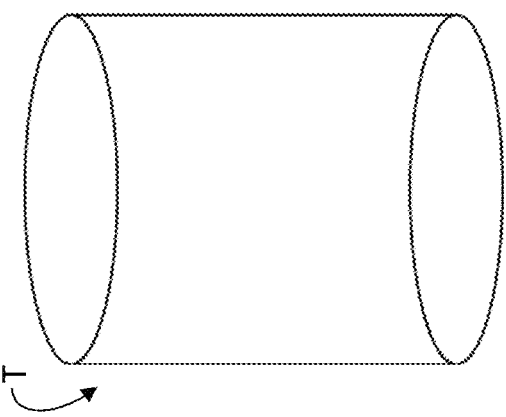

For packaging applications that require resistance to high internal pressure, i.e. cylindrical containers containing granules or liquids, use of corrugated board which is an embodiment of the invention can increase bending stiffness that will prevent bulging of the container. FIG. 36 compares a container T made of the multi-layer corrugated board which is an embodiment of the invention on the left, which exhibits no bulging, with a container R made of single-layer corrugated board, for example, the bendable single-layer corrugated board of WO 2013/141769 A1, on the right. In such an application, it is preferable to use an outer uncorrugated layer with high tensile strength to avoid rupture of the container wall.

Apart from the mechanical properties of the inner uncorrugated layers and corrugated layers, the materials forming these layers can have barrier properties that for example will resist grease, oxygen, water and aromas (e.g. through different coating, extrusion and sizing techniques). In one embodiment, the innermost uncorrugated layer exhibits barrier properties by one or more of these means. Uncorrugated layers and corrugated layers may also be treated with chemicals to increase the wet mechanical properties, retard flame, inhibit mould, discourage attack by vermin, or achieve other desirable effects.

Besides packaging, corrugated board which is an embodiment of the invention can be used for several other applications. In particular, the corrugated board according to the present invention can provide a suitable material for constructing known structures typically not constructed from corrugated board. Embodiments of the invention can therefore be for use as a structural component.

For example, in furniture or architectural construction, rods and beams can be replaced by small-radius tubes formed by rolling the corrugated board according to the present invention.

Further, walls or other planar elements can be formed by adhering sheets of corrugated board according to the present invention together with their inner faces facing one another, optionally with one or more further layers of another material in between. Such a configuration is then rigid, that is, resistant to bending in all directions. Preferably, such a structure can be formed by transporting rolls of the corrugated board according to the present invention to a location and then unrolling them and adhering them together to provide a rigid structure at the location where the assembled structure is required. Such a configuration may provide a convenient alternative to other prefabrication techniques e.g. flat-pack techniques or partial assembly techniques.

In this regard, the embodiments having greater number of layers may be suitable for more heavy-duty applications. The following classes of materials are proposed:

- 2-5 corrugated layers: packaging;
- 5-10 corrugated layers: furniture, small portable structures, single-person shelters;
- 10-50 corrugated layers: light civil engineering, large human-scale structures, buildings, multiple-person shelters;
- 50+ corrugated layers: heavy civil engineering, roads, bridges, tall buildings and those designed to withstand excessive forces.

The above-disclosed embodiments can be straightforwardly adapted without undue effort or experimentation to apply to a variety of boxes having desirable configurations. In light of the foregoing disclosure, there will also be many alternatives which implement the teaching of the present disclosure. It is expected that one skilled in the art will therefore be able to modify and adapt the above disclosure to suit his own circumstances and requirements within the scope of the present invention, while retaining some or all technical effects of the same, either disclosed or derivable from the above, in the light of his common general knowledge of the art. All such equivalents, modifications or adaptions fall within the scope of the invention hereby defined and claimed.

The invention claimed is:

1. A corrugated board having a layered structure, the layered structure comprising:
    a first outer uncorrugated layer defining a first surface of the corrugated board;
    a second outer uncorrugated layer defining a second surface of the corrugated board;
    a plurality of corrugated layers arranged between the first outer uncorrugated layer and the second outer uncorrugated layer, each corrugated layer having flutes running in the same direction as the other corrugated layers of the plurality of corrugated layers;
    one or more intermediate uncorrugated layers, each intermediate uncorrugated layer interposed between and attached to a respective pair of the plurality of corrugated layers,
    wherein when the corrugated board is bent from a flat state in a first bending direction about a first axis extending along the direction of the flutes such that the second outer uncorrugated layer becomes the inside of the bent structure, a group of sequential uncorrugated layers selected from the second outer uncorrugated layer and the one or more intermediate uncorrugated layers buckles before the first outer uncorrugated layer buckles, each layer of the group of sequential uncorrugated layers buckling along a plurality of lines between sequential peaks of an adjacent corrugated layer.

2. The corrugated board according to claim 1, wherein when the corrugated board is bent from the flat state in a second bending direction about a second axis extending along the direction of the flutes such that the first outer uncorrugated layer becomes the inside of the bent structure, either the first outer uncorrugated layer buckles along a single line before the second outer uncorrugated layer buckles or the second outer uncorrugated layer breaks in tension before the first outer uncorrugated layer buckles.

3. The corrugated board according to claim 1, wherein the group of sequential uncorrugated layers buckle sequentially.

4. The corrugated board according to claim 1, wherein the group of sequential uncorrugated layers buckle simultaneously.

5. The corrugated board according to claim 1, wherein the group of sequential uncorrugated layers includes one intermediate uncorrugated layer adjacent to the first outer uncorrugated layer.

6. The corrugated board according to claim 1, wherein the corrugated board can be bent in the first bending direction to a radius of curvature of five times a thickness of the board measured from the first surface to the second surface before the first outer uncorrugated layer buckles.

7. The corrugated board according to claim 6, wherein the corrugated board can be bent in the first bending direction to a radius of curvature of two times the thickness of the board before the first outer uncorrugated layer buckles.

8. The corrugated board according to claim 1, wherein the corrugated layer closest to the first outer uncorrugated layer has a smaller fluting pitch than another corrugated layer.

9. The corrugated board according to claim 8, wherein the corrugated layer closest to the first outer uncorrugated layer has a smaller fluting pitch than the corrugated layer closest to the second outer uncorrugated layer.

10. The corrugated board according to claim 1, wherein the first outer uncorrugated layer carries surface ornamentation.

11. The corrugated board according to claim 1, wherein the second outer uncorrugated layer provides a second surface of the board which is at least one of a liquid-impermeable coating, a gas-impermeable coating, or a coating of an inert material.

12. The corrugated board according to claim 1, wherein a coating is provided to the second outer uncorrugated layer to form the second surface.

13. The corrugated board according to claim 1, wherein the first outer uncorrugated layer is a liner board or a laminate including liner board.

14. The corrugated board according to claim 1, wherein the second outer uncorrugated layer is a polymer layer or a laminate including a polymer layer.

15. The corrugated board according to claim 1, wherein the neutral plane of bending in the first bending direction of the board is between the first outer uncorrugated layer and the intermediate uncorrugated layer immediately adjacent to the first outer uncorrugated layer.

16. The corrugated board according to claim 1, wherein the bending stiffness of each of the second outer uncorrugated layer and the one or more intermediate uncorrugated layers satisfies the equation $$EI < (SCT \times \lambda^2)/(4 \times \pi^2)$$

in which:
    EI represents the bending stiffness of the layer about the direction of the flutes;
    SCT represents the compression strength of the layer perpendicular to the direction of the flutes; and
    $\lambda$ represents the length between two peaks of the adjacent corrugated layer in a radially outward direction relative to the first bending direction.

17. The corrugated board according to claim 1, wherein the number of intermediate uncorrugated layers is at least 1, 2, 3, 4 or 5.

18. A container, comprising corrugated board according to claim 1, exhibiting at least one curved surface portion.

19. A structure, comprising corrugated board according to claim 1, exhibiting at least one curved surface portion, as a structural component.

\* \* \* \* \*